United States Patent [19]
Todd et al.

[11] Patent Number: 5,165,628
[45] Date of Patent: Nov. 24, 1992

[54] SUPPORT SYSTEMS AND COMPONENTS THEREOF

[75] Inventors: George R. Todd, 18333 NE. 146th, Woodinville, Wash. 98072; Verne L. Lindberg, Everett, Wash.

[73] Assignee: George R. Todd, Woodinville, Wash.

[21] Appl. No.: 558,581

[22] Filed: Jul. 27, 1990

Related U.S. Application Data

[63] Continuation-in-part of Ser. No. 252,855, Oct. 3, 1988, Pat. No. 4,961,553.

[51] Int. Cl.[5] ............................................. F16L 3/08
[52] U.S. Cl. ........................................ 248/62; 248/72
[58] Field of Search .................... 248/62, 58, 59, 72, 248/74.1, 223.4, 224.2, 297.2, 297.3; 403/387, 398, 400

[56] References Cited

U.S. PATENT DOCUMENTS

| | | |
|---|---|---|
| 1,668,953 | 5/1928 | Erickson . |
| 2,273,571 | 2/1942 | Hafemeister . |
| 2,569,622 | 10/1951 | Trainor . |
| 2,651,489 | 9/1953 | Bell . |
| 3,042,352 | 7/1962 | Stamper . |
| 3,132,831 | 5/1964 | Stamper . |
| 3,226,069 | 12/1965 | Clarke . |
| 3,527,432 | 9/1970 | Lytle . |
| 3,565,385 | 2/1971 | Zurawski . |
| 3,650,499 | 3/1972 | Biggane . |
| 4,212,445 | 7/1980 | Hagen . |
| 4,417,711 | 11/1983 | Madej . |
| 4,638,966 | 1/1987 | Ford . |
| 4,695,019 | 9/1987 | Lindberg et al. . |
| 4,789,286 | 12/1988 | Laput . |
| 4,961,553 | 10/1990 | Todd ................................. 248/62 |

FOREIGN PATENT DOCUMENTS

| | | |
|---|---|---|
| 2164991 | 7/1973 | Fed. Rep. of Germany . |
| 2617117 | 10/1977 | Fed. Rep. of Germany . |

OTHER PUBLICATIONS

Spring 1987 Catalog from Aickinstrut, Inc. P.O. Box 569, Redmond, Wash. 98073.

Primary Examiner—Alvin C. Chin-Shue
Attorney, Agent, or Firm—Hughes & Multer

[57] ABSTRACT

Systems for supporting pipes and other loads which include elongated struts and channels that are fabricated from non-metallic materials and can be surface mounted. Clamps, connectors, and other fittings for attaching the supported load to the channel fit into cooperating notches in flanges spaced inwardly from the side walls of the channel. This interfitting relationship provides a positive connection between the fitting and the channel, keeping even heavy loads and loads subjected to vibration, hammering, or the like from slipping, even if the supporting channel is vertically oriented and the load is therefore the most susceptible to slippage. Rounded transition sections at the ends of the notches facilitate the manufacture of the channels, minimize or even eliminate stress concentrations, and insure that loads supported by the system are satisfactorily distributed even if the fittings are tilted or canted relative to the channels.

17 Claims, 4 Drawing Sheets

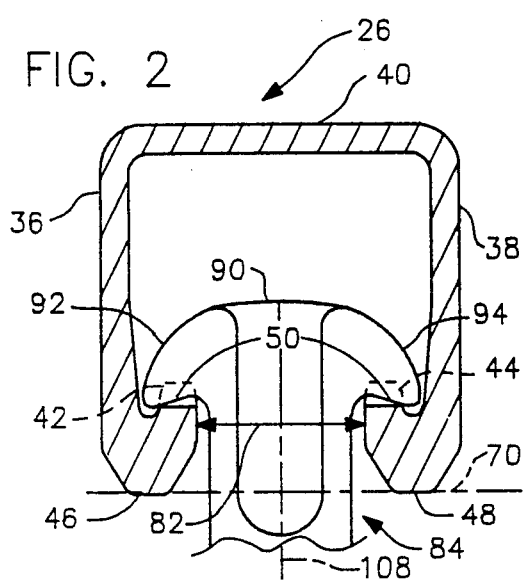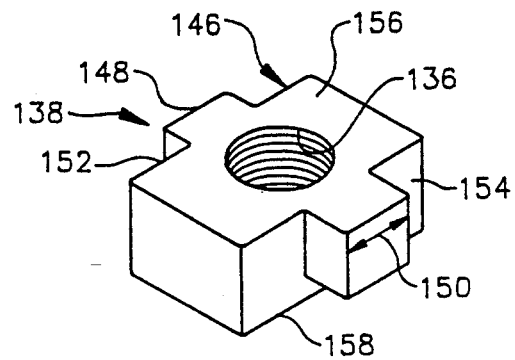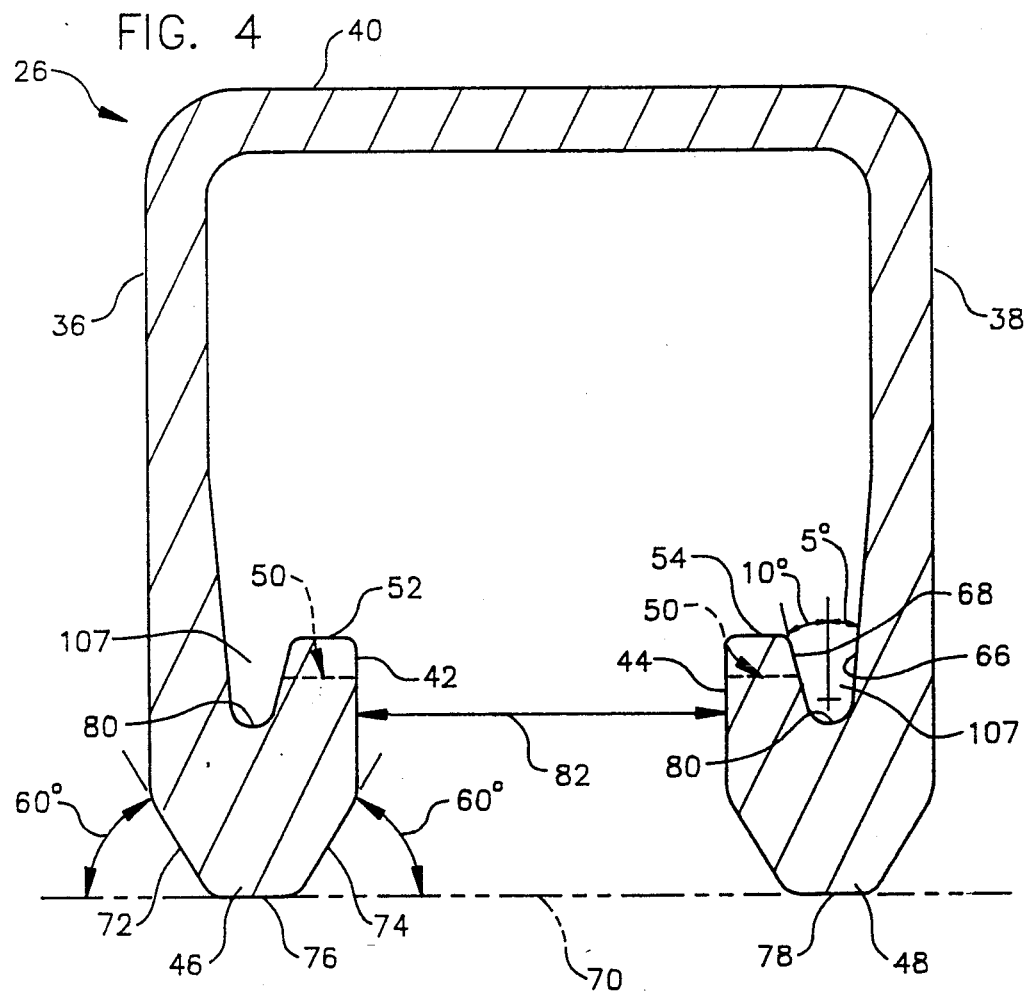

5,165,628

SUPPORT SYSTEMS AND COMPONENTS THEREOF

RELATION TO OTHER APPLICATION

This application is a continuation-in-part of U.S. Pat. application Ser. No. 252,855 filed Oct. 3, 1988, U.S. Pat. No. 4,961,553, issued Oct. 9, 1990, by George R. Todd for SUPPORT SYSTEMS FOR PIPES AND OTHER LOADS.

TECHNICAL FIELD OF THE INVENTION

In one aspect, the present invention relates to novel, improved systems for supporting pipes, conduits, and other loads.

And, in another aspect, the present invention relates to novel, improved struts or channels for such systems.

BACKGROUND OF THE INVENTION

A number of systems for supporting pipes and other components from elongated, U-section components variously termed struts and channels have heretofore been proposed. Systems of the foregoing character of which we are aware are disclosed in U.S. Pat. Nos.: 1,668,953 issued May 8, 1928, to Erickson for MOLDING FOR ELECTRIC CABLES; U.S. Pat. No. 2,273,571 issued Feb. 17, 1942, to Hafemeister for PIPE HANGER; 3,042,352 issued Jul. 3, 1962, to Stamper for PIPE HANGER; U.S. Pat. No. 3,132,831 issued May 12, 1964, to Stamper for CLIP-ON PIPE HANGER; U.S. Pat. No. 3,226,069 issued Dec. 28, 1965 to Clarke for HANGER FOR CYLINDRICAL CONDUITS AND THE LIKE; 3,527,432 issued Sept. 8, 1970, to Lytle for PIPE OR TUBING SUPPORT; U.S. Pat. No. 3,565,385 issued Feb. 23, 1971, to Zurawski for FLUORESCENT TUBE BOX SUSPENSION SYSTEM AND MEANS; U.S. Pat. No. 3,650,499 issued Mar. 21, 1972, to Biggane for CLAMP FOR PIPE SUPPORT WITH SLANTING PIVOTAL ASSEMBLY; U.S. Pat. No. 4,417,711 issued Nov. 29, 1983, to Madej for PIPE HANGER; and U.S. Pat. No. 4,695,019 issued Sept. 22, 1987, to Lindberg et al. for NON-METALLIC STRUT SYSTEM and in: Offenlegungsschrift No. 2164991 filed 28 Dec. 1971 by Niedax Ges. F. Verlegungsmaterial mbH and laid open to public inspection on 12 July 1973 and a Spring 1987 catalog from Aickinstrut, Inc., P. O. Box 569, Redmond, Washington 98073.

Systems of the type disclosed in the foregoing patents and the Aickinstrut catalog with surface mounted struts or channels have been in use for over fifty years to support pipes, electrical raceways, and other system components from the floors, walls, and ceilings of buildings and from other structures. The struts or channels of the system are attached to the structure; and clamps, connectors, and other fittings are employed to attach the supported component (or load) to the channels or struts.

The earlier systems of this type were fabricated from such then available materials as cold rolled steel (see, for example, above-cited U.S. Pat. Nos. 1,668,953 and 2,273,571), and a number of systems of comparable character have been proposed in more recent years (see above cited U.S. Pat. Nos. 3,042,352; 3,132,831; 3,226,069; 3,565,385; 3,650,499; and 4,417,711). These heretofore proposed systems have the decided disadvantage that they offer little resistance to corrosion unless painted or galvanized. Even then, they deteriorate rapidly in aggressive chemical environments, for example in pulp mills and in buildings housing plating tanks. Therefore, as engineered polymers became available, a number of manufacturers substituted those materials for the theretofore employed steels and other metals. To date, this has met with only limited success. This is primarily because the designers of non-metallic support systems have not taken into account the physical differences between the non-metallic and metallic materials they employed. Of particular significance in this respect are the typically quite different coefficients of friction of the metallic and non-metallic materials employed in systems of the type under discussion.

Specifically, in a typical, heretofore proposed system with metal components, there is a simple frictional fit between the supporting strut or channel and the fixture installed in that channel to support a from it (see, for example, above cited U.S. Pat. Nos. 3,226,069; 3,527,432; 3,565,385; 3,650,499; and 4,417,711) With non-metallic, engineered polymers substituted for the theretofore utilized metallic components (see, as an example, above-cited U.S. Pat. No. 4,695,019), this approach proves somewhat less than satisfactory. Due to the much lower coefficients of friction, the load-supporting fixture can easily slip along the supporting strut or channel when a polymer is substituted for metal in a conventional support system design, allowing the load to shift. This is especially true in applications in which the supporting channels are vertically oriented, particularly if the load is relatively heavy or subjected to vibration or hammering and because the pipe runs are often then employed as ladder rungs. Shifting loads are of course very undesirable as they radically increase the potential for system failure.

The use of stop blocks in the load-supporting channel or a complicated channel and fixture arrangement with extended continuous contact therebetween (see the above-cited U.S. Pat. No. 4,695,019 and the Aickinstrut catalog) to increase the fixture-to-channel contact area and therefore increase the friction between these system components and minimize slippage of the supported load has heretofore been proposed. This approach is, however, not without its disadvantages. Perhaps the most important of these is that the average installer must be reeducated and his resistance to employing a non-conventional system with an additional component overcome. Secondly, available stop blocks are relatively expensive; and large numbers of these components (typically four per foot) are required. Therefore, in a typical installation, systems employing stop blocks are not competitive unless corrosion problems are severe and support systems with metallic components can not be employed. Finally, and as a corollary, systems with stop blocks are typically not competitive because of the additional labor required to install a system of that character.

Another approach to preventing slippage that is suggested in the prior art is to notch the side walls of the U-sectioned supporting channel and to install the load connecting system components in these notches so that the fitting cannot slip relative to the channel, even if the latter is vertically oriented. The above-cited Stamper U.S. Pat. Nos. 3,042,352 and 3,132,831 disclose systems of the just-described character. Again, however, the heretofore proposed system is not one which would be satisfactory if channels fabricated of engineered polymers rather than metal components were employed to get the corrosion resistance and other benefits of those non-metallic materials. Specifically, the slots or notches in the Stamper channels leave lips or ears of very small section on which the supported load is imposed. In applications involving heavy loads or vibration, these lips would be very apt to fail, resulting in system failure. If an engineered polymer with its lower shear strength were substituted for steel in Stamper's systems, this tendency would be many times aggravated; and the substitution would produce a system of little if any value.

Furthermore, failure of one load will often have a domino effect with adjacent loads failing until the entire system or a large section of it has been destroyed. Thus, the heretofore proposed support systems have the important drawback that they are unable to prevent such catastrophic failures.

Another salient disadvantage of the Stamper systems is that it would be extremely difficult, if possible at all TM to connect cross channels between parallel horizontal or vertical runs. The side walls of the Stamper systems are so thin, in this respect, that it would not be practical to support a cross-channel of the Stamper type from the side walls of a normally extending channel as would be required to connect those channels together. Thus, as a grid of supporting channels is typically required, the applications in which the Stamper systems would be useful are extremely limited.

Still another disadvantage of the Stamper systems is that no provision is made for retaining a channel nut or other fixture component in the load-supporting strut. This is a significant drawback as channel nuts and the like can be employed to advantage in attaching connectors and other fittings via which one channel may be connected to a cross channel and also via which a variety of different load devices may be attached to a channel. Modifications of the Stamper channels which would allow the use of channel nuts and the like would be impractical because the channel configurations required to retain such devices would increase the cost of the channels to the point where the system would become economically non-competitive if the channels were rendered in metal.

Niedax discloses a support system which is like those of Stamper to the extent that it employs notched channels. These notches are formed in the rearmost, free or exposed edges of cooperating flanges which are integral with, and spaced inwardly from, the side walls of the channels. The channels are fabricated from thin, non-load bearing sheet metal. Material of that character is employed so that the notches can be stamped out and so that the channel can be fabricated by bending at a low enough cost to make it practical. In the Niedax system, the channels are notched only so that the associated, load-attaching components can be inserted into the channels once the latter have been embedded in concrete. The channels are not intended to be surface mounted. They would sag and collapse, and/or the load would pull on the channel and cause its side walls to fail unless the channel were embedded. In short, the Niedax channel is not a structural member or support. It is instead intended to, and does, function only as an anchor as is made clear by the title of the reference -- Anchor Rail.

To at least a large extent, the foregoing and other disadvantages of the just-discussed support systems are eliminated in those support systems disclosed in parent U.S. Pat. application Ser. No. 252,855. These novel, improved support systems, generally speaking, include elongated struts or channels which can be surface mounted and clamps, connectors, and other fittings for attaching a load to the supporting channel. The system components may be fabricated of non-metallic materials. This makes the novel systems disclosed in the U.S. Pat. application Ser. No. '855 application appropriate for even highly corrosive environments. At the same time, the system components are simple and relatively inexpensive to manufacture; and the resulting systems are accordingly sufficiently inexpensive to be employed in even the most mundane of applications.

Perhaps most prominent among the novel features of the systems disclosed in the '855 application is the type of supporting channel which is employed. Like conventional channels, they have a U-shaped cross-section; and, like those disclosed in Stamper U.S. Pat. Nos. 3,042,352 and 3,132,831, the channels disclosed in the '855 application have notches in which the load-supporting fittings can be engaged to keep the load from shifting, even in demanding applications in which the channels are vertically oriented and the loads are heavy or of a nature which causes hammering or vibration. In contrast to the Stamper channels, however, these notches are not formed in the side walls of the channel. Instead, they are molded or otherwise formed in the rearmost, free or exposed edges of cooperating flanges which are integral with, and spaced inwardly from, the side walls of the channels.

One consequence of this novel construction is that the load-supporting capacity of the channel is dramatically increased over that available in a Stamper-type channel even though the materials may have less shear strength because much thicker sections are practical. A second, also significant, advantage of the channels disclosed in the '855 application is that channel nuts and other trapped-type fittings can be employed, greatly increasing the versatility of the channel by increasing the types of fittings which may be employed with it. At the same time, and because they are fabricated from non-metallic materials, the channels disclosed in the '855 application can be supplied at competitive costs whereas they could not be, if fabricated from metal as Stamper's are.

The channels disclosed in the '855 application are fabricated from rigid, vibration absorbing, engineered polymers. And, even though applicant's materials may have less shear strength than Stamper's or Niedax's, much thicker sections are practical. One consequence of this novel construction is that the load-supporting capacity of the channel is dramatically increased over that available in the channel of the Stamper or Niedax systems. This makes it entirely feasible to use the channels disclosed in the '855 case in applications requiring surface mounting and relatively long, unsupported runs. For example, they can be end supported from the exposed surfaces of vertically or horizontally oriented and spaced apart beams. Again, this is an important application for which the Niedax channel is totally unsuitable. It must be embedded in a structural material such as concrete to be useful because of its inability to otherwise support a load of any appreciable magnitude.

A further, important difference between the Niedax channel and those disclosed in the '855 application is the channel configuration—rectangular as opposed to trapezoidal. One important advantage of the rectangularly configured channels disclosed in the '855 application is that such channels can easily be connected into a network or grid of intersecting channels. It would be difficult and expensive, if practical at all, to so connect Niedax-type channels because of their slanting side walls.

Yet another, also significant, difference between the channels disclosed in the '855 application and those of Niedax is that the channels disclosed in the '855 application are fabricated of vibration absorbing or damping polymers. Niedax does not make channels of this or any comparable material. Instead, his channels are made of a vibration transmitting material; and the embedding of the channel in concrete is relied on for vibration damping.

Furthermore, the channels disclosed in the '855 application have segments with different thicknesses. This permits the several segments to be designed in a manner which optimizes the structural attributes of the channel. The only practical way to fabricate the Stamper, Niedax, and other metal channels is to bend them from sheet metal; and this technique could of course not be employed to fabricate a multisegment-multithickness strut.

SUMMARY OF THE INVENTION

We have now invented, and disclosed herein, certain new and novel load-supporting systems which have all of the above-discussed features and advantages of the load-supporting systems disclosed in the '855 application plus other, at least equally important advantages.

These novel, herein disclosed support systems differ from those disclosed in the '855 application primarily in that they employ channels with notches which have rounded inner corners rather than the sharp, square inner corners of the notches in those channels disclosed in the earlier filed application.

Important consequences follow this new and novel configuration. One is that the crack-promoting stresses associated with sharp intersections are avoided. A second is that notches of the configuration disclosed herein are significantly easier to generate, thereby making channels of the character disclosed in this specification significantly easier and less expensive to manufacture than those disclosed in the '855 application.

An at least equally important advantage of the novel channels disclosed herein is that their rounded end notches better accommodate variations in the angle at which those fittings supporting the load from the channel meet the latter. If the fitting of a system as disclosed in the '855 application is tipped or canted —i.e., oriented at angle of other than 90° relative to the associated channel—the channel associated end of the fitting may not seat securely in the bottom of the notch in which that end of the fitting is disposed. At best, this could result in unwanted, concentrated loads being imposed on the fitting and/or on the channel. In contrast, in the novel systems disclosed herein, there is a large area of surface-to-surface contact between the fitting and channel, even if the fitting is tipped. Thus, loads on the channel and fitting are well distributed irrespective of whether the fitting is tipped or oriented at other than a right angle to the associated channel.

Because tipping or canting is thus accommodated, the load-supporting systems disclosed therein are more versatile than those to which the '855 application is devoted. As one example, pipe clamp and other fittings for systems of the character disclosed herein and in the '855 application have two elements which fit in longitudinally spaced pairs of notches in a system channel. A fitting optimized to support a specific load—such as a pipe of a particular diameter —may have an element-to-element spacing that does not exactly equal the spacing between the pairs of notches. This can result in canting which may be undesirable in systems with rectangularly notched channels but perfectly acceptable in systems with channels having rounded end notches as disclosed herein.

OBJECTS OF THE INVENTION

From the foregoing, it will be apparent to the reader that one important and primary object of the present invention resides in the provision of novel, improved systems for supporting pipes and other loads.

Related and also important but more specific objects of the invention reside in the provision of support systems as defined in the preceding object:

which employ elongated, load-supporting struts that can be fabricated of non-metallic components and are therefore useful in highly corrosive environments as well as in applications with less demanding requirements;

which, in conjunction with the preceding objects, employ elongated, load-supporting channels or struts and are so designed and constructed that slippage of the load relative to the channel is prevented, even when the channel is vertically oriented and the load is heavy and/or subject to vibration or hammering or other slippage promoting influences;

which employ channels that can be surface mounted and employed in relatively long, unsupported spans;

which employ load-supporting channels so configured as to allow use of channel nuts and other devices employed in conventional support systems to attach pipes and other loads to the struts of those systems;

which employ load-supporting channels so configured that two cross or other channels can be easily and securely fixed to each other;

which are economically competitive with available metallic and non-metallic support systems;

which do not require that the installer be trained or educated in the installation of the system;

which are versatile in that a variety of loads of different character can be supported from the same channel(s) of the system.

Still another important and primary object of the present invention is the provision of novel, improved channels or struts for systems of the character described in the preceding objects.

Related but more specific objects of the invention reside in the provision of channels as characterized in the preceding object:

which have notched flanges with the notches being of a configuration that makes the notches easily and inexpensively produced in commercial quantities;

which, in conjunction with the preceding object, have a notch configuration which minimizes, or even eliminates, stress concentrations at the ends of the notches:

which readily accommodate tipping or canting relative to the channel of fittings which support loads from the channel.

Other important objects and features and additional advantages of the invention will be apparent to the reader from the appended claims and as the ensuing detailed description and discussion proceeds in conjunction with the accompanying drawing.

BRIEF DESCRIPTION OF THE DRAWING

In the drawing:

FIG. 2 is a partial transverse section through the support system shown in FIG. 1;

FIG. 4 is a transverse section, to an enlarged scale, of the su system channel;

FIG. 7A is a perspective of a channel nut employed in the system of FIG. 7; and

DETAILED DESCRIPTION OF THE INVENTION

Figure 1:
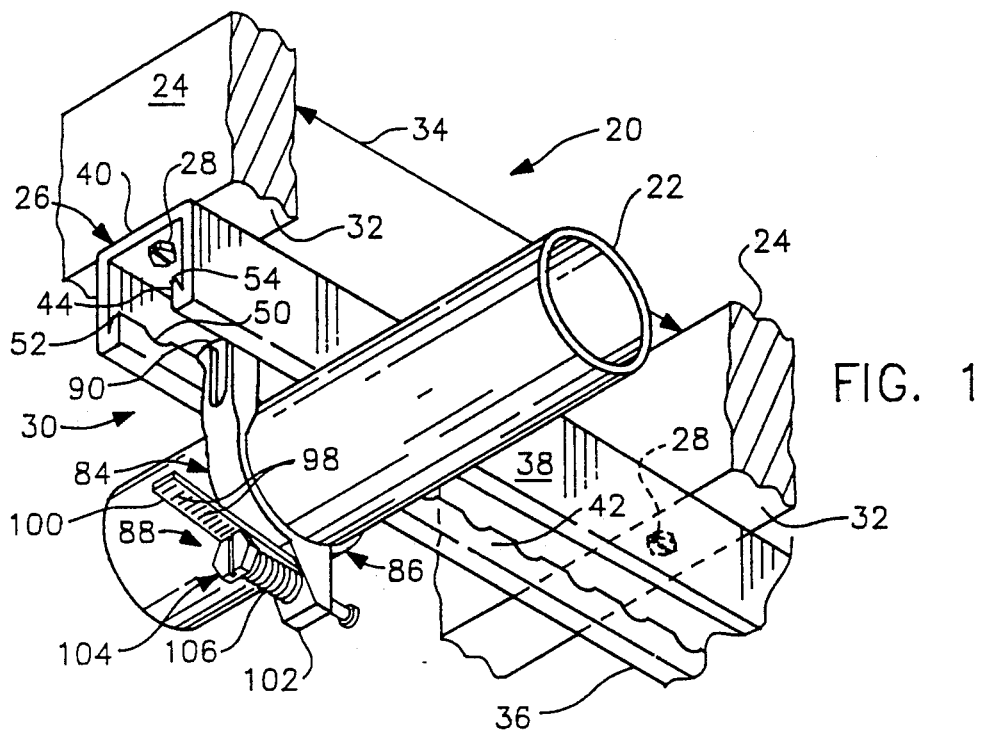
FIG. 1 is a pictorial view of a pipe support system embodying the principles of the present invention.
Figure 3:
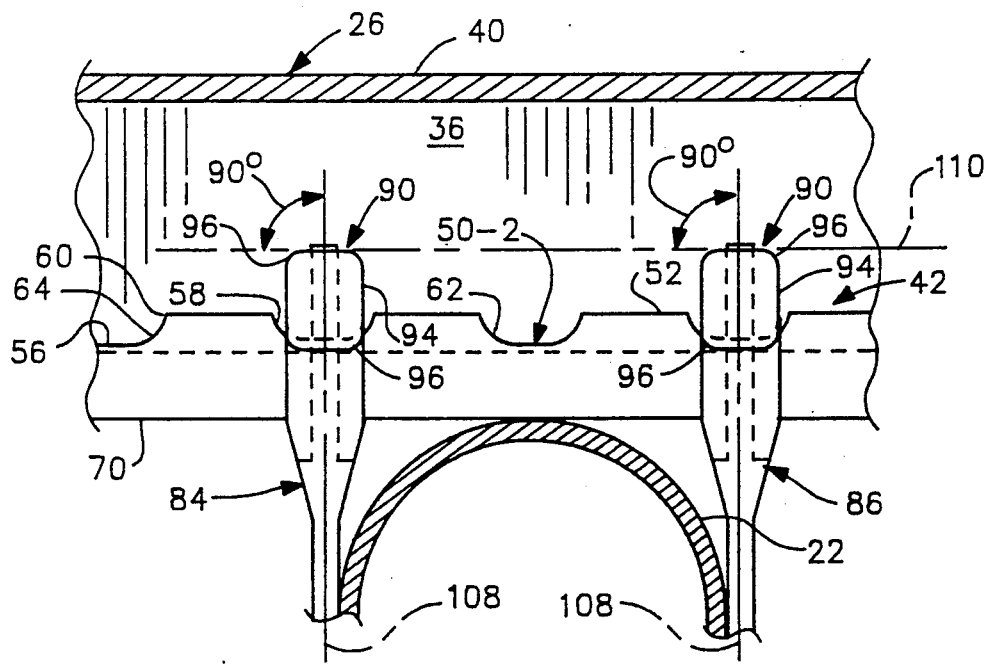
FIG. 3 is a partial longitudinal section through the support system of FIG. 1 with a load-supporting fitting oriented at right angles to a strut or channel of the system.

Referring now to the drawing, FIGS. 1-3 depict a system 20 for supporting a pipe 22 from a framework or static structure represented in FIG. 1 by a series of horizontally spaced joists or beams 24. System 20 is constructed in accord with, and embodies, the principles of the present invention.

The major components of pipe-supporting system 20 are: (a) a rigid, elongated strut or channel 26, which is fixed to joists 24 as by the illustrated lag bolts 28; and (b) a clamp 30 for attaching the pipe to channel 24.

Strut or channel 26 both supports pipe clamp 30 and prevents unwanted, and potentially disastrous, shifting of the pipe clamp and the supported load—pipe 22—relative to the channel.

In the illustrated application of support system 20, channel 26 is surface mounted; i.e., it is attached to, and contacts only, the exposed surfaces 32 of beams 24. Furthermore, channel 26 is attached to the static structure only at the locii of beams 24, leaving relatively long spans of the channel unsupported. One such unsupported clear span or run is identified in FIG. 1 by reference character 34.

Strut 26 has a U-shaped configuration (see FIGS. 1, 2, and 4); and it has integral side and back walls 36, 38, and 40 with the side walls parallel and the back wall meeting the side walls at right angles. Spaced inwardly from channel side walls 36 and 38 are integral flanges 42 and 44. These extend from the forward edges of channel side walls 36 and 38 toward the rear wall 40 of the channel. Flanges 42 and 44 parallel the side walls 36 and 38 of the channel and are connected to the adjacent side walls by integral, transversely extending channel portions 46 and 48.

Elongated notches 50 of uniform shape and size are formed in, and spaced equidistantly along, the inner flanges 42 and 44 of channel 26. These notches or recesses 50 open onto the rear wall facing, free edges 52 and 54 of channel flanges 42 and 44.

Each notch 50 has a bottom 56 and ends 58 and 60. Integral, arcuate transition sections—or rounded corners—62 and 64 respectively join the ends 58 and 60 of each notch 50 to its bottom 56.

In one typical application of the present invention, channel 26 is fabricated from a glass filled polypropylene or from polyvinylchloride. As is best shown in FIG. 4, side and back walls 36, 38, and 40 are approximately 0.125 in thick (that dimension and those which follow are nominal). The facing, side wall and flange surfaces 66 and 68 taper at the illustrated angles of 5° and 10° beginning at a point 0.813 in from the front edge 70 of the channel. This thicken and strengthen channel side walls 36 and 38. The outer side wall and flange surfaces 72 and 74 are tapered at an angle of 60° relative to front edge 70, leaving surface segments 76 and 78 at that edge which are 0.188 in wide. Fifty thousandth inch radius fillets 80 join side walls 36 and 38 to flanges 42 and 44; and the gap 82 between flanges 42 and 44 is 0.750 in wide.

The illustrated channel 26 is typically 1.625 in wide and 1.625 in or 1.125 in deep. In these exemplary channels, notches 50 are 0.125 in deep and 0.500 in long and are spaced 0.500 in apart along flanges 42 and 44 with the notches in the two flanges paired and located opposite each other. The radii of the transition sections 62 and 64 joining the notch ends 58 and 60 to bottom or inner edge 56 of each notch 50 are 0.188 in maximum. Notches 50 are relatively easy and inexpensive to mill or otherwise generate. The radii are large enough to eliminate stress concentrations at the ends of the notches and to provide large areas of stress distributing surface-to-surface contact between the channel and canted clamps or other load-attaching fittings as well as those which are normally oriented.

Clamp 30 is made up of two, straplike, pipe-encasing components 84 and 86 and a fastener assembly 88. The latter clamps pipe 22 between components 84 and 86 and against the front edge 70 of channel 26.

Each of the clamp components 84 and 86 has an integral, mushroom-shaped head 90 at the inner, or channel-associated, end thereof. Integral, transversely extending flanges 92 and 94 with rounded edges 96 appear at opposite sides of each head 90.

The assembly 88 employed to fasten the two components 84 and 86 of clamp 30 together with pipe 22 therebetween is shown in FIG. 1. It includes a series of parallel, equidistantly spaced apart, transversely extending slots 98 in the outer, or free end, section 100 of clamp component 84. This section 54 of component 42 slidably extends through the associated clamp component 84 adjacent the outer, or free end, section 102 of that component.

Cooperating with slots 98 to fasten clamp components 84 and 86 together is a screw 104 housed for rotation in the outer, free end section 102 of pipe clamp component 86 and constrained against axial movement in that component The threads 106 on this screw engage the slots 98 in pipe clamp component end section 100. Therefore, by rotating screw 104 in clamp component 86, the straplike end section 100 of component 84 can be displaced through the cooperating component 86 of clamp 30. This draws the two components 84 and 86 of the clamp together to fix pipe 22 therebetween and against the flanges 42 and 44 of the associated strut 26 at the front edge 70 of the strut (see FIG. 1).

In the completed strut-clamp-pipe assembly, the integral flanges 92 and 94 at the channel associated heads 90 of clamp components 84 and 86 extend laterally relative to the longitudinal centerlines 108 of the clamp members. These flanges are seated in a transversely aligned pair of notches 50 in the two, integral, inner flanges 42 and 44 of channel 26 (see, especially, FIGS. 2 and 3). This provides an interfitting relationship between the components of the clamp and the associated strut or channel 26 and a positive connection therebetween. Also, the pipe 22 held against channel 24 by clamp 30 keeps the heads 90 of the clamp components from leaving the notches 50 in channel flanges 42 and 44.

The result of the novel arrangement just described is that the clamp components and the pipe 22 therebetween cannot slip relative to channel 26. This is true even if the channel is vertically oriented and the weight of the pipe and/or any fluids flowing therethrough and/or forces such as vibration or hammering are contributing to the tendency of the clamp to slip downwardly with respect to channel 26. Thus, in even these most demanding applications, the novel support system disclosed herein positively prevents slippage of a supported pipe relative to a supporting channel by providing a positive, interfitting engagement between the channel and the system components by which the supported pipe is attached to that channel.

Also, in contrast to heretofore available systems of the same general character, the heads 90 of clamp components 84 and 86 need not fill the gaps 107 shown in FIG. 4 and lying between the side walls 36, 38 and flanges 42, 44 of channel 26. As a result, clamp components of the character shown in FIG. 3 are significantly easier to install and remove; and they can be installed in much shallower channels.

Yet another important advantage of the present invention is that the channels 26 with their novel, rounded end notches 50 readily accommodate tilting or canting of clamp components 84 and 86 and other load-supporting fittings relative to the channel. Thus, FIG. 3 depicts an assembly or system 20 in which the supported load, pipe 22, is so located along channel 26 and is of a diameter such that the longitudinal centerlines 108 of clamp components 84 and 86 are oriented at right angles to the longitudinal centerline 110 of channel 26 with the flanges 92 and 94 of the clamp member heads 90 seated on the inner edges 56 of notches 50 and distributing the load imposed on the channel by pipe 22. However, because of the pipe diameter, the location of the pipe run along the channel, etc., it may not always be convenient, or even practical, to realize this idealized relationship. In the case of the present invention, however, that is not apt to be of any particular consequence. Instead, the flanges 92 and 94 at the heads 90 of canted clamp components 84 and 86 will rest in part on the bottom edges 56 of the notches 50 and in part on the arcuate transition sections 58 and 60 at the ends of the notches (or even the ends 86 and 88 themselves). This ensures that the load is distributed by a large area of flange-to-channel surface-to-surface contact even if the ideal channel-to-clamp component angular relationship is not achieved.

Figure 5:
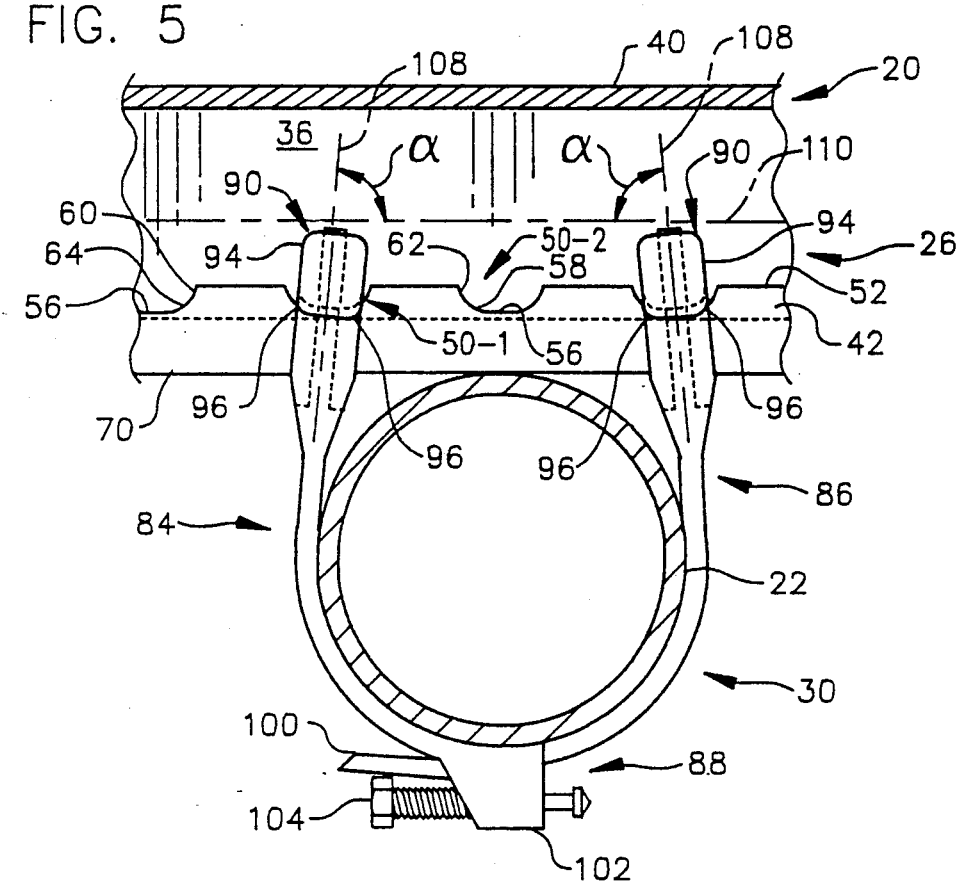
FIGS. 5 and 6 are views similar to FIG. 3 but with the elements of the load-supporting fitting tipped or canted relative to the channel of the system.

FIG. 5, for example, depicts a system in which the diameter of pipe 22 is larger than the distance between the two pairs of notches 50-1 and 50-3 in which the heads 90 of clamp components 84 and 86 are seated. This results in inward tilting of the two clamp components and acute angles o between the clamp component and channel centerlines 108 and 110 instead of the 90° angle shown in FIG. 3. Nevertheless, the load imposed by pipe 22 is satisfactorily distributed by the two flanges 92 and 94 at the head 90 of clamp component 84, by virtue of the surface-to-surface contact therewith, to: (a) the bottoms 56 of notches 50-1, and (b) the rounded transition sections 64 at the ends 60 of those notches and from the two flanges 92 and 94 at the head 90 of clamp component 86 to: (c) the bottom edge 56 of notches 50-3 and (b) the rounded transition sections 62 of notches 50-3.

Figure 6:
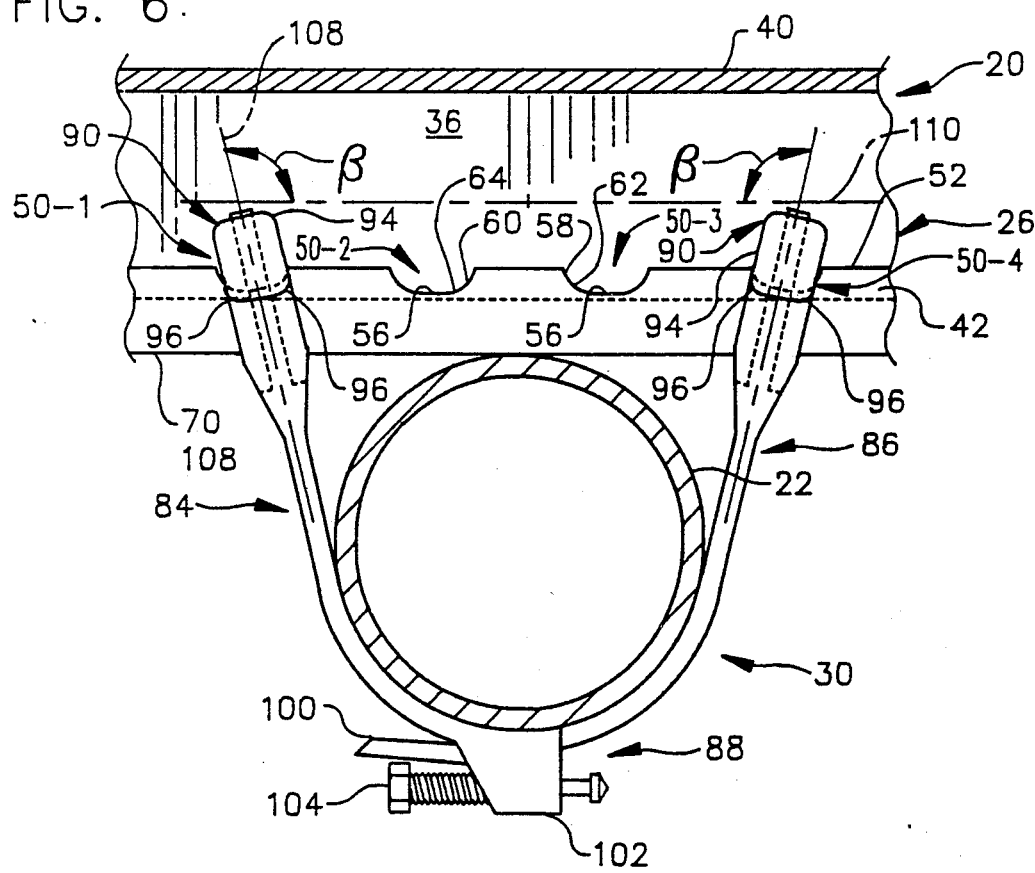

FIG. 6 depicts a second, also representative, example of a system with canted clamp components. In this case, the clamp components 84 and 86 tilt outwardly because the diameter of pipe 22-2 is smaller than the distance between paired channel notches 50-1 and 50-4. In this case, there are obtuse angles $\beta$ between the longitudinal centerlines 108 of clamp components 84 and 86 and the longitudinal centerline 110 of channel 24. Again, however, a satisfactory distribution of the load imposed by pipe 22 on channel 26 by way of pipe clamp components 84 and 86 is achieved. In this case there are large areas of surface contact between the two head flanges 92 and 94 of clamp component 84 and: (a) the bottom edges 56 of paired notches 50-1 and (b) the rounded transition sections 62 of those notches and between flanges 92 and 94 land between the flanges 92 and 94 of clamp component 86 and: (c) the bottom edges 56 of paired channel notches 50-4 and (d) the rounded transition sections 64 of those notches.

Yet another important advantage of the present invention is that important benefits discussed above —such as lack of slippage, accommodation of canted support fitting components, and ease of channel notch fabrication—can be obtained in support systems employing load-attaching fittings which differ considerably from the clamp 30 shown in FIGS. 1-3, 5, and 6 and discussed above. Furthermore, this benefit can be obtained without dimensional or other modification of the channel or strut-type support 26 illustrated in those figures. This is important in that it simplifies and significantly reduces the cost of providing a channel or strut system in those applications where more than one type of fitting is needed—for example, one to support loads from the struts and a second to connect the struts together.

Figure 7:
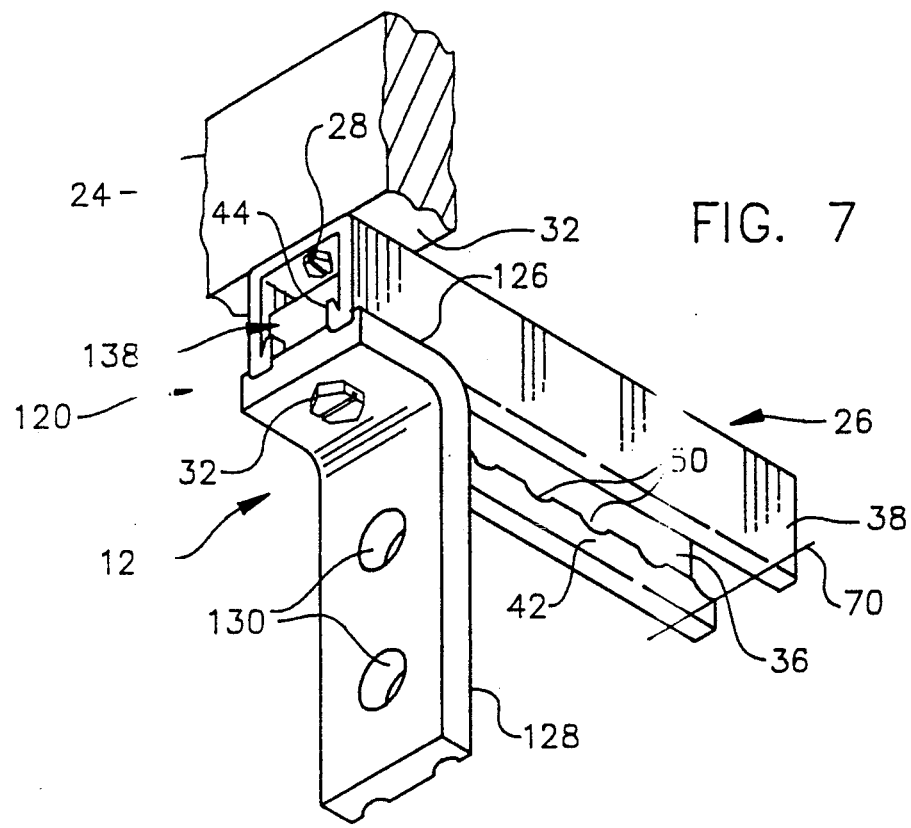
FIG. 7 is a view, similar to FIG. 1, of a second system like that shown in FIG. 1 but employing a different type of fitting for attaching loads to the channel of the system.

FIG. 7, for example, depicts a support system 120 embodying the principles of the present invention in which a supported component or load such as the end of another channel (not shown) is attached to channel or strut 26 by a L-shaped connector 124. A system of this type may, for example, employ two connectors of the type identified by reference character 124 disposed in back-to-back relationship to couple a cross strut or channel to strut 26.

Connector 124 has two integral legs 126 and 128 disposed at right angles to each other. Apertures 130 through leg 128 accommodate fasteners (not shown). Those are employed to attach a supported component to connector 124.

The second, integral leg 126 of connector 124 is fixed to the side walls 36 and 38 of channel 26 by a fastener 132. This fastener extends through an aperture (not shown) in connector leg 126 and is threaded into the internally threaded aperture 136 of a rectangular channel nut 138.

Channel nut 138 (see FIG. 7A) has a cruciform configuration; a body 146 with the internally threaded aperture 136 for fastener 132; and integral, facing lugs 148 and 150 of identical configuration extending outwardly from opposite sides 152 and 154 of the body 146 of the nut. These lugs extend downwardly from the upper surface 156 of the nut to a level above the bottom edge 158 of that component. The two lugs 148 and 150 of channel nut 138 have a length 1 which is slightly less than the corresponding longitudinal dimensions of the notches 50 in the flanges 36 and 38 of channel 26. This allows the lugs 148 and 150 of nut 138 to be easily but positively seated in notches 50 when connector 124 is assembled to channel 26.

Nuts 138 have a transverse dimension w which is less than the span between the two side walls 36 and 38 of channel 26. This allows the nut to be slid through channel 26 to the desired location of connector 124 therealong without binding, yet keeps the nut from rotating in the channel and allowing fastener 132 to come loose.

The cruciformlike nut 138 just described has the advantage that it allows system 120 to be designed for heavy shear loads. At the same time, the above-discussed configuration and dimensions of lugs 148 and 150 allow identical channels (or the same channel) to accept both connectors of the character shown in FIGS. 7 and 7A and pipe-supporting clamps of the type shown in FIGS. 1-3 and/or other types of connectors.

Also, in system 120, the channel nut 138 of connector 124 is fitted into and trapped in the flange-associated notches 50 of the connector-supporting strut or channel 26. Therefore, the connection 124—and consequently the components attached to that connector—cannot slip or shift along channel 26 even in the worst case in which that channel is vertically oriented; a heavy load is supported from it; and hammering, vibrational, or other forces are imposed on the load.

Figure 8:
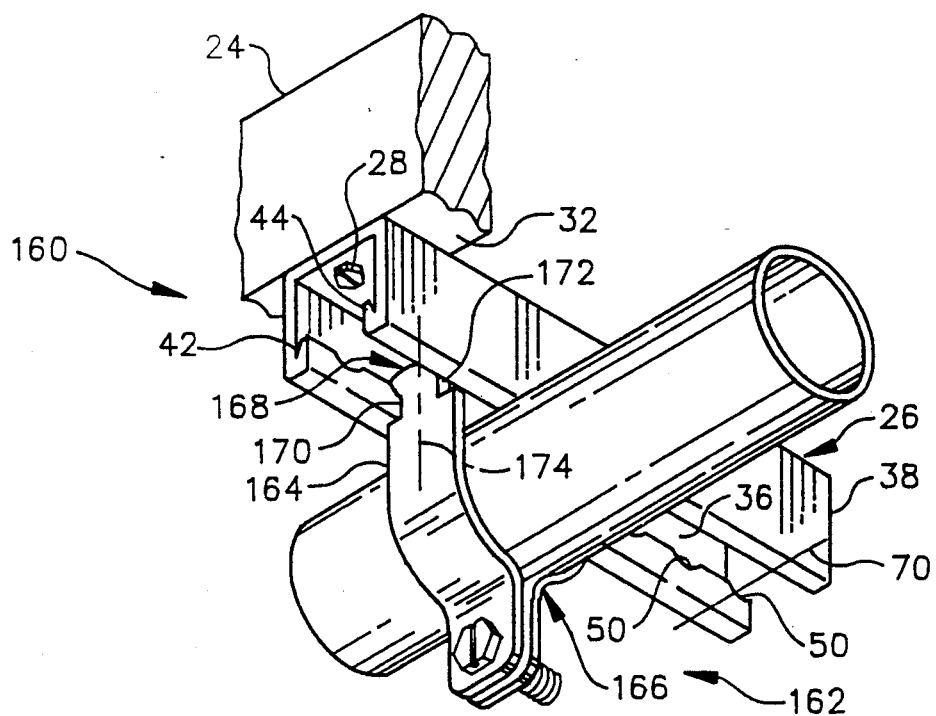
FIG. 8 is a view, similar to FIGS. 1 and 7, of a third load-supporting system employing the principles of the present invention.

Referring again to the drawing, FIG. 8 depicts a second system 160 for supporting pipe 22 from ceiling joists 24.

In addition to channel 26, pipe support system 160 includes a pipe clamp 162. The latter is composed of two straplike components 164 and 166 configured to clamp pipe 22 therebetween and thereby support the pipe from channel 26.

The upper, channel spanning heads 168 of the two, cooperating pipe clamp components 164 and 166 (one of which is shown in FIG. 8) have notches 170 and 172 which extend at right angles to the longitudinal centerline 174 of each pipe clamp component.

With the pipe clamp 162 of system 160 assembled to the associated channel 26, the opposite edge portions of both pipe clamp component heads 168 are seated on the bottom edges 56 of the notches 50 in channel 26. A pipe 22 located between the pipe clamp components keeps the heads 168 of the pipe clamp components seated in notches 50. Thus, as in the embodiments of the invention discussed previously, there is an interfitting relationship between the channel and pipe clamp components in system 160 and a positive connection therebetween which keeps the pipe from shifting along channel 26 even in the worst case orientation of the channel and supported pipe discussed above.

Channels 26 which will accommodate pipe clamps as illustrated in FIGS. 1-3 and connectors as shown in FIG. 7A will equally well accommodate clamps of the type shown in FIG. 8. This further demonstrates the universality of the novel channel-type support of the present invention in accepting, without modification, a variety of load attaching clamps and other connectors.

Like those illustrated in FIGS. 1-3, the trapped parts of the fittings shown in FIGS. 7 and 8 (or other fittings) need not fill the gaps 107 between the side walls 36, 38 and flanges 42, 44 of the channel. As discussed above, this is decidedly advantageous in assembling and disassembling the support system.

It is of course not essential in constructing systems employing the principles of the present invention that channels of type illustrated in the drawing and identified by reference character 24 be employed to the exclusion of conventional channels. Instead, the use of channels 24 can be restricted to locations where slippage is apt to occur and the simpler, even less expensive to produce, conventional channels employed elsewhere. This even further reduces the cost of the system and increases its economic competitiveness.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A support system comprising: an elongated channel and a component for attaching a load to be supported to said channel, said channel having spaced apart side walls, a back wall spanning said side walls, and flanges which are spaced inwardly from said side walls and have free edges facing said back wall; said loading attaching component including an element trapped in said channel; said flanges and the trapped element of said load attaching component having interengageable means providing a positive connection between said channel and said component and thereby keeping said component and said load from shifting relative to said channel; those of the interengageable means associated with said channel being oppositely positioned, paired notches formed in and opening onto the free edges of said flanges at intervals therealong; there being a series of notches in each of said flanges; all of said notches being of similar dimensions and configuration and having ends spanned by an inner edge and rounded corners joining the ends to the inner edge; the spacing between successive notches in each series thereof being the same; and the trappedelement of the load attaching component being configured to cmplement said notches and thereby keep the load attaching component from shifting along said channel.

2. A support system as defined in claim 1 wherein said load attaching component includes first and second members having main body portions which are adapted to cooperate to confine a supported element therebetween, said members also having integral elements trapped in said channel, the trapped elements of the two members being adapted to respectively fit in two spaced apart pairs of said oppositely positioned notches, and the trapped elements of the two members being configured as aforesaid to complement the notches in the flanges of said channel to thereby keep the first and second members of the load attaching component and a load attached to the channel by said component from moving longitudinally relative to the channel.

3. A support system as defined in claim 2 in which the first and second members of the load attaching component are cooperating, straplike members disposed in facing relationship with cooperating portions thereof shaped to embrace opposite sides of the supported load, said load attaching component also including fastener means for clamping said straplike members together with the load between and embraced by said members.

4. A support system as defined in claim 3 wherein said fastener means extends through one of said straplike members and is threaded into the other of said members and is thereby capable of drawing said members together with the load between said members as aforesaid.

5. A support system as defined in claim 3 wherein said fastener means is located at ends of the cooperating, straplike members which lie beyond the confines of said channel and comprises a series of parallel, transverse slots in that portion of one of said straplike members adjacent the aforesaid end thereof; said portion of said one member slidably extending through said second straplike member adjacent an end thereof as aforesaid; and said fastener means further comprising an element so rotatably mounted at said end of the second straplike member and having threads engageable in said slots that rotation of said element is effective to draw said portion of said one member through said second member and thereby clamp said members together in embracing relationship to the load.

6. A support system as defined in claim 1 in which the load attaching component includes a member with a cruciform configuration providing two oppositely extending, integral lugs, it being said member that is the trapped element of the load attaching component and said member having lugs that fit into the selected pair of oppositely positioned notches in the channel as aforesaid to keep said load attaching component from shifting relative to the channel and the aforesaid member of the load supporting component further having an integral main body portion which fits between and spans the flanges of the channel.

7. An elongated channel which is adapted to be used with a load attaching component having an element thereof trapable in said channel to support a load from the channel and to keep the load from shifting along said channel, said channel being fabricated of a rigid polymer and having: a pair of spaced apart side walls; a back wall spanning said side walls; flanges which are spaced inwardly from said side walls and have free edges facing said back wall; and means with which a trapped element of the load supporting component can be engaged t keep the load supporting component and a supported load from slipping relative to said channel, those means with which said trapped element are engageable being oppositely positioned, paired notches formed in and opening onto the free edges of said flanges at intervals therealong; all of said notches being of similar dimensions and configuration and having ends spanned by an inner edge and rounded corners joining the ends to the inner edge; and the spacing between successive pairs of notches being the same.

8. A channel as defined in claim 13 which is fabricated from an engineered polymer.

9. The combination of a static structure and a system for supporting a load from said structure, said support system including an elongated channel as defined in claim 7, means for attaching said channel only to one or more exposed surfaces of the static structure and only at intervals along the channel, and means for attaching a load to the channel.

10. A combination as defined in claim 9 wherein said load attaching component includes first and second members having main body portions which are adapted to cooperate to confine a supported element therebetween, said members also having integral elements trapped in said channel, the trapped elements of the two members being adapted to respectively fit in two spaced apart pairs of said oppositely positioned notches, and the trapped elements of the first and second members being configured as aforesaid to complement the notches in the flanges of said channel and keep said members of the load attaching means and a load attached to the channel by said component from moving longitudinally relative to the channel.

11. A combination as defined in claim 10 in which the first and second members of the load attaching component are cooperating, straplike members disposed in facing relationship with cooperating portions thereof shaped to embrace opposite sides of the supported load, said load attaching component also including fastener means for clamping said straplike members together with the load between and embraced by said members.

12. A combination as defined in claim 11 wherein said fastener means extends through one of said straplike members and is threaded into the other of said members and is thereby capable of drawing said members together with the load between said members as aforesaid.

13. A combination as defined in claim 11 wherein said fastener means is located at ends of the cooperating, straplike members which lie beyond the confines of said channel, and comprises a series of parallel, transverse slots in that portion of one of said straplike members adjacent the aforesaid end thereof; said portion of said one member slidably extending through said second straplike member adjacent an end thereof as aforesaid; and said fastener means further comprising an element so rotatably mounted at said end of the second straplike member and having threads engageable in said slots that rotation of said element is effective to draw said portion of said one member through said second member and thereby clamp said members together in embracing relationship to the load.

14. A support system as defined in claim 9 in which the load attaching means includes a member with a cruciform configuration providing two oppositely extending, integral lugs, it being said member that is the trapped element of the load attaching component, said member having lugs that fit into the selected pair of oppositely positioned notches in the channel as aforesaid to keep said load attaching component from shifting relative to the channel, and the aforesaid member of the load supporting component further having an integral main body portion which fits between and spans the flanges of the channel.

15. A support system comprising: an elongated channel and a component for attaching a load to said channel, said channel having spaced apart side walls, a back wall spanning said side walls, and flanges which are spaced inwardly from said side walls and have free edges facing said back wall; said load attaching component having an element thereof trapped in said channel and an element extending from said channel; and the trapped element of said load attaching component and said channel having cooperating means for distributing to said channel loads imposed on the channel by the load attaching component over a range of angles between he longitudinal axis of the extending element of the load attaching component and the longitudinal axis of the channel by providing large areas of surface contact between the trapped element of the load attaching component and the flanges of the channel over the range of angular relationships between the load attaching fitting and the channel, the cooperating, load distributing means of the system comprising a pair of oppositely positioned, longitudinally extending notches in the flanges of said channel and opening on to the free edges of said flanges, said notches having ends, the trapped element of the load supporting component spanning said flanges and being seated in said notches, and there being rounded transition sections at the ends of said notches on which the trapped element of the load attaching component can in part rest.

16. The combination of a static structure and a system for supporting a load from said structure, said support system comprising: a rigid elongated channel fabricated of a non-metallic material; a component for attaching a load to said channel; and means for attaching said channel only to one or more exposed surfaces of said static structure and only at intervals along said channel; said channel having spaced apart side walls, a back wall spanning said side walls, and flanges which are spaced inwardly from said side walls and have free edge surfacing said back wall; said load attaching component of the support system having an element trapped in said channel; and said flanges and the trapped element of said load attaching component having interengageable means providing a positive connection between said channel and said component and thereby keeping said component and said load from shifting relative to said channel, those of the interengageable means associated with said channel being oppositely positioned, paired notches, the trapped element of the load attaching component being configured to complement said notches and thereby keep the load attaching component from shifting along said channel, and the notches in the channel having rounded transition sections which cooperate with the trapped element of the load attaching component to accommodate variations in the angular relationship between the longitudinal axis of the load attaching element and the longitudinal axis of the channel.

17. A combination as defined in claim 16 in which the channel of the support system has a series of paired notches as aforesaid, all of said notches being of similar dimensions and configuration and the spacing between successive notches in each series thereof being the same.

* * * * *